(12) United States Patent
Kochura et al.

(10) Patent No.: US 10,783,447 B2
(45) Date of Patent: Sep. 22, 2020

(54) INFORMATION APPROPRIATENESS ASSESSMENT TOOL

(71) Applicant: International Business Machines Corporation, Armonk, NY (US)

(72) Inventors: Nadiya Kochura, Bolton, MA (US); Alphonse Joseph Wojtas, East Hampstead, NH (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 15/170,395

(22) Filed: Jun. 1, 2016

(65) Prior Publication Data
US 2017/0351961 A1 Dec. 7, 2017

(51) Int. Cl.
*G06N 20/00* (2019.01)
*G06Q 50/00* (2012.01)
*G06Q 30/02* (2012.01)
*G06F 16/9535* (2019.01)

(52) U.S. Cl.
CPC ......... *G06N 20/00* (2019.01); *G06F 16/9535* (2019.01); *G06Q 30/0201* (2013.01); *G06Q 50/01* (2013.01)

(58) Field of Classification Search
CPC ............... G06N 20/00; G06F 16/9535; G06Q 30/0201; G06Q 50/01
See application file for complete search history.

(56) References Cited

U.S. PATENT DOCUMENTS

| | | |
|---|---|---|
| 2009/0119173 A1 | 5/2009 | Parsons et al. |
| 2010/0262454 A1 | 10/2010 | Sommer |
| 2012/0177532 A1 | 7/2012 | Hebda et al. |
| 2013/0124644 A1* | 5/2013 | Hunt .............. H04L 51/12 709/206 |
| 2013/0290232 A1 | 10/2013 | Tsytsarau |
| 2014/0088944 A1 | 3/2014 | Natarajan et al. |
| 2015/0052087 A1 | 2/2015 | Srinivasan et al. |
| 2017/0139921 A1* | 5/2017 | Ball ................ G06F 16/24578 |

OTHER PUBLICATIONS

Babu, K., and P. Charles. "A System to Filter Unwanted Words Using Blacklists in Social Networks." K. Babu et al./(IJCSIT) International Journal of Computer Science and Information Technologies 5.2 (2014): 1748-1753. (Year: 2014).*

(Continued)

*Primary Examiner* — Eric Nilsson
(74) *Attorney, Agent, or Firm* — Stephen R. Yoder

(57) ABSTRACT

An electronic appropriateness assessment tool ("tool") can be configured to select information in response to an electronic request for the information. In one example, the request may be by a device associated with a user. In another example request may be by a social media platform. Before providing the information to the device, the tool can determine an appropriateness level of the information. In some instances, the tool can determine the appropriateness level based on social media data. The social media data may be expressions of sentiment about content made by social contacts of the user via the social media platform. The electronic appropriateness assessment tool can further determine a degree of the information to provide for presentation based on the appropriateness level.

20 Claims, 7 Drawing Sheets

(56) References Cited

OTHER PUBLICATIONS

Artzi, et al., "Predicting Responses to Microblog Posts", Proceedings of the 2012 Conference of the North American Chapter of the Association for Computational Linguistics: Human Language Technologies. Association for Computational Linguistics, 2012, 5 pages.
Marshall, et al., "Social Media Ownership: Using Twitter as a Window onto Current Attitudes and Beliefs", Proceedings of the SIGCHI Conference on Human Factors in Computing Systems, ACM, 2011, 10 pages.
Nguyen, et al., "Predicting Collective Sentiment Dynamics from Time-series Social Media", Proceedings of the first international workshop on issues of sentiment discovery and opinion mining. ACM, 2012, 8 pages.
Pennington, et al., "GloVe: Global Vectors forWord Representation", Conference on Empirical Methods in Natural Language Processing (EMNLP), 2014, 12 pages.
Tang, et al., "Sentiment Embeddings with Applications to Sentiment Analysis", IEEE Transactions on Knowledge and Data Engineering, vol. XX, No. X, XXXX, 2015, 14 pages.
Manning et al., "Introduction to Information Retrieval", © 2008 Cambridge University Press, 8 pages, <https://nlp.stanford.edu/IR-book/html/htmledition/irbook.html>.

\* cited by examiner

US 10,783,447 B2

INFORMATION APPROPRIATENESS ASSESSMENT TOOL

BACKGROUND

Embodiments of the inventive subject matter generally relate to the field of networks, and, more particularly, to assessing information available on networks.

People who navigate networks for information, such as individuals who search the Internet, often encounter information that they consider inappropriate. Unfortunately, those people have little protection against encountering such information.

SUMMARY

An electronic appropriateness assessment tool ("tool") can be configured to select information in response to an electronic request for the information. In one example, the request may be by a device associated with a user. In another example, the request may be by a social media platform. Before providing the information to the device, the tool can determine an appropriateness level of the information. In some instances, the tool can determine the appropriateness level based on social media data. The social media data may be expressions of sentiment about content made by social contacts of the user via the social media platform. The electronic appropriateness assessment tool can further determine a degree of the information to provide for presentation based on the appropriateness level.

BRIEF DESCRIPTION OF THE DRAWINGS

The present embodiments may be better understood, and numerous objects, features, and advantages made apparent to those skilled in the art by referencing the accompanying drawings.

DETAILED DESCRIPTION

The description that follows includes exemplary systems, methods, techniques, instruction sequences and computer program products that embody techniques of the present inventive subject matter. However, it is understood that the described embodiments may be practiced without these specific details. For instance, although examples refer to assessing information obtained via the Internet, other examples can be associated with assessing information from other forms of public or private networks such as from commercial databases, distributed storage systems, social networks, and so forth. In other instances, well-known instruction instances, protocols, structures and techniques have not been shown in detail in order not to obfuscate the description.

As mentioned previously, individuals are often subjected to inappropriate information, such when searching the Internet, when on social media outlets, and so forth. Some embodiments of the inventive subject matter include a tool configured to determine whether information would be appropriate to present to a user. For instance, the tool can predict a level of emotional reaction that the information may evoke in the user. The tool can block presentation of the information or provide a warning about the information if the information is deemed inappropriate or possibly inappropriate. The tool may perform operations that evaluate an appropriateness level of the information. In some instances, the tool can use machine learning to classify the information according to the appropriateness levels. In addition, the tool can analyze the information based on feedback by individuals from groups that are relevant to the user. Each of the individuals from the groups may have differing levels of relationship strength to the group. For instance, each group may have a hierarchy of importance of the members of the group, based on any number of factors. Based on the levels of relationship strength, the tool can assign a weight value to one or more of the individuals. The tool can use the weight value(s) to assess the appropriateness level of the information.

Figure 1:
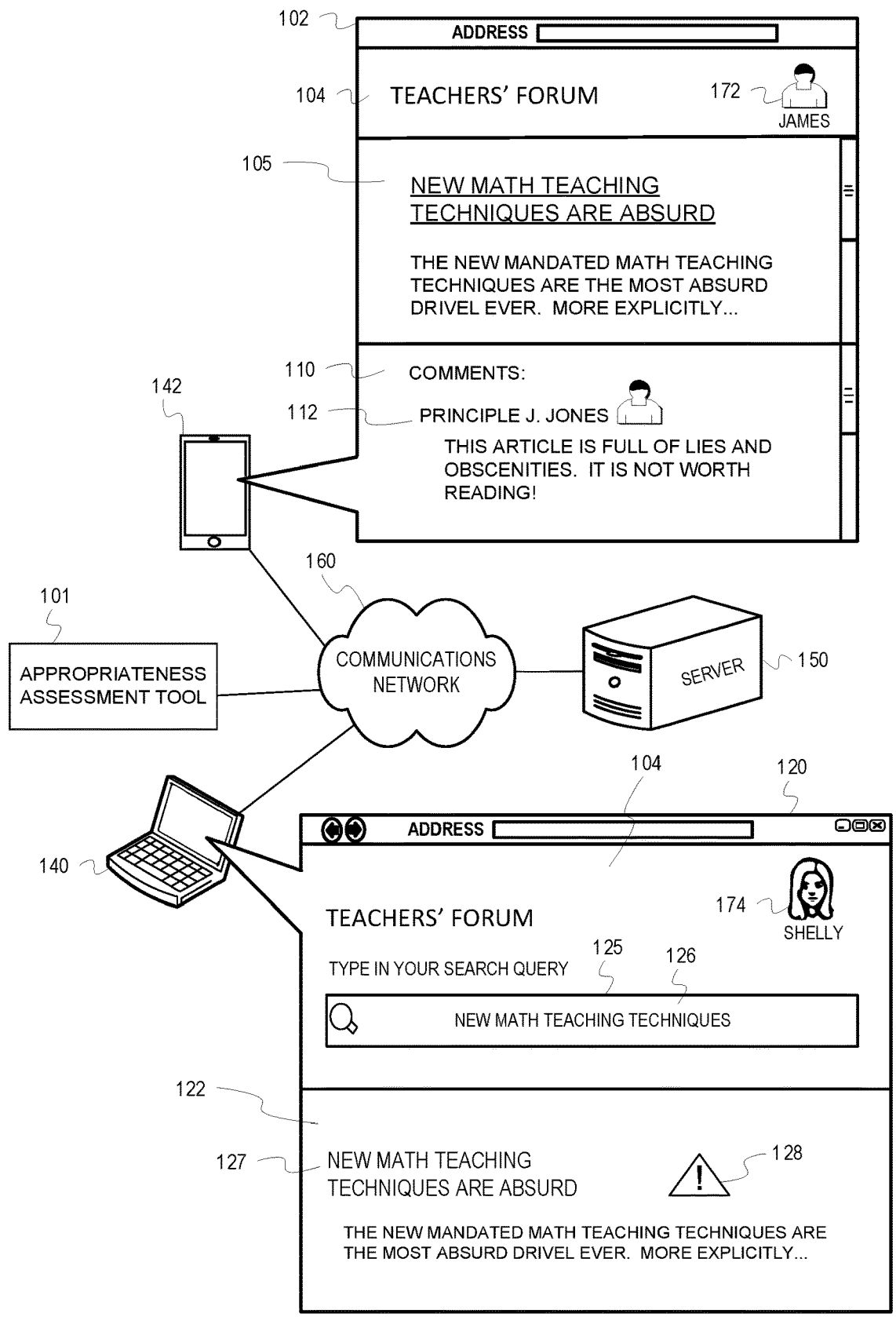
FIG. 1 is an illustration of an example of assessing an appropriateness of information before determining whether to provide access to the information.

FIG. 1 illustrates an example of assessing an appropriateness of information before determining whether to provide access to the information. In FIG. 1, an electronic appropriateness assessment tool ("tool") 101 is configured to access devices connected to a communications network 160. For instance, a server 150, a personal computer 140, and a mobile device 142 are connected to the communications network 160. The tool 101 may be incorporated into one or more of the server 150, the personal computer 140 or the mobile device 142. In some examples, the tool 101 may be distributed across the server 150, the personal computer 140 and/or the mobile device 142. In some instances, the tool 101 may be incorporated into another device separate from the server 150, the personal computer 140, or the mobile device 142 (e.g., in a separate server not shown).

The tool 101 is configured to determine appropriateness levels of certain types of information available via the communications network 160. For instance, the tool 101 determines that a certain web article 105 is evaluated by an individual (e.g., Principal James Jones, who is a principal of a school at which a user, Shelly, teaches). For instance, via the mobile device 142, the individual logs into a web site 104 via a browser application 102. A login indicator 172 indicates a user account identifier for the individual (e.g., an avatar for that represents Principal James Jones). The mobile device 142 presents the web article 105 via the browser 102. The article 105 is related to a topic for which Principal Jones is an authority. Principal Jones makes a comment 112 in a comments section 110 of the website 104. The comment 112 is related to the article 105. The comment 112 includes specific words that express a negative sentiment regarding the article 105 (e.g., the comment 112 expresses Principal Jones' opinion that the article is untruthful and/or obscene). The appropriateness assessment tool 101 parses the words in the comment 112 and, via a machine learning technique, trains itself regarding the topic of the article 105 and whether it may be inappropriate for other readers. Machine learning involves algorithms that can learn from and make predictions on data. Such algorithms operate by building a model from example inputs in order to make data-driven predictions or decisions. The tool 101 can utilize machine learning to computationally map example inputs to desired outputs by a learning process. Through the learning process, the tool 101 learns and/or utilizes one or more rules that map the inputs to the outputs. For instance, the tool 101 can use algorithms, learning models, rules, and so forth, associated with expressions of human sentiment, examples of certain types of language, opinions of experts on relevant topics, past preferences indicated by a user, and so forth. The tool 101 trains itself on appropriateness for a type of information (e.g., information for a particular topic, information from a specific venue, information for a particular group, information having specific inappropriate words, etc.). For instance, based on an analysis of the words of the article 105, the tool 101 may determine that the article 105 includes words or phrases that may be considered inappropriate to an average person.

Subsequently, the user, Shelly (indicated by a user account indicator 174) may run a search of the website 104 for information. For instance, via a browser 120, the user enters a search query 126 within a search field 125. The search query 126 is related to a topic of the article 105. Consequently, the server 150 runs the search query and returns search results 122 in which a link 127 to the article 105 is presented. The tool 101 determines, based on a profile for Shelly's user account, that she belongs to a group of employees from the same school, and that Principal James Jones is a leader of the group. The tool 101 determines, based on the analysis of the article 105, that the article 105 contains potentially inappropriate information. For instance, the tool 101 analyzes the article and determines that it has words that are typically considered to be foul language or obscene. Furthermore, the tool 101 reads a profile setting for Shelly's user account. The profile settings indicate that Shelly prefers content without obscenities. The tool 101 can assign an appropriateness level for the article 105 based on the analysis and user preferences. Furthermore, the tool 101 adjusts the appropriateness level based on Principal Jones' comment 112 about the article 105. The tool 101 also adjusts the appropriateness level based on a hierarchical level of Principal Jones within the group to which Principal Jones and Shelly belong. Because Principal Jones has a leadership role in the group (e.g., based on the title of "Principal"), the tool 101 assigns a weight value to Principal Jones. The tool 101 uses the weight value when adjusting the appropriateness level for the article 105. Based on the analysis and adjustments to the appropriateness level, the tool 101 determines a type of warning indicator 128 to present regarding the link 127 to the article 105. The tool 101 presents the warning indicator 128 proximal to the link 127. Thus, the user, Shelly, is notified, via the browser 120, about the inappropriateness level for the article 105.

Figure 2:
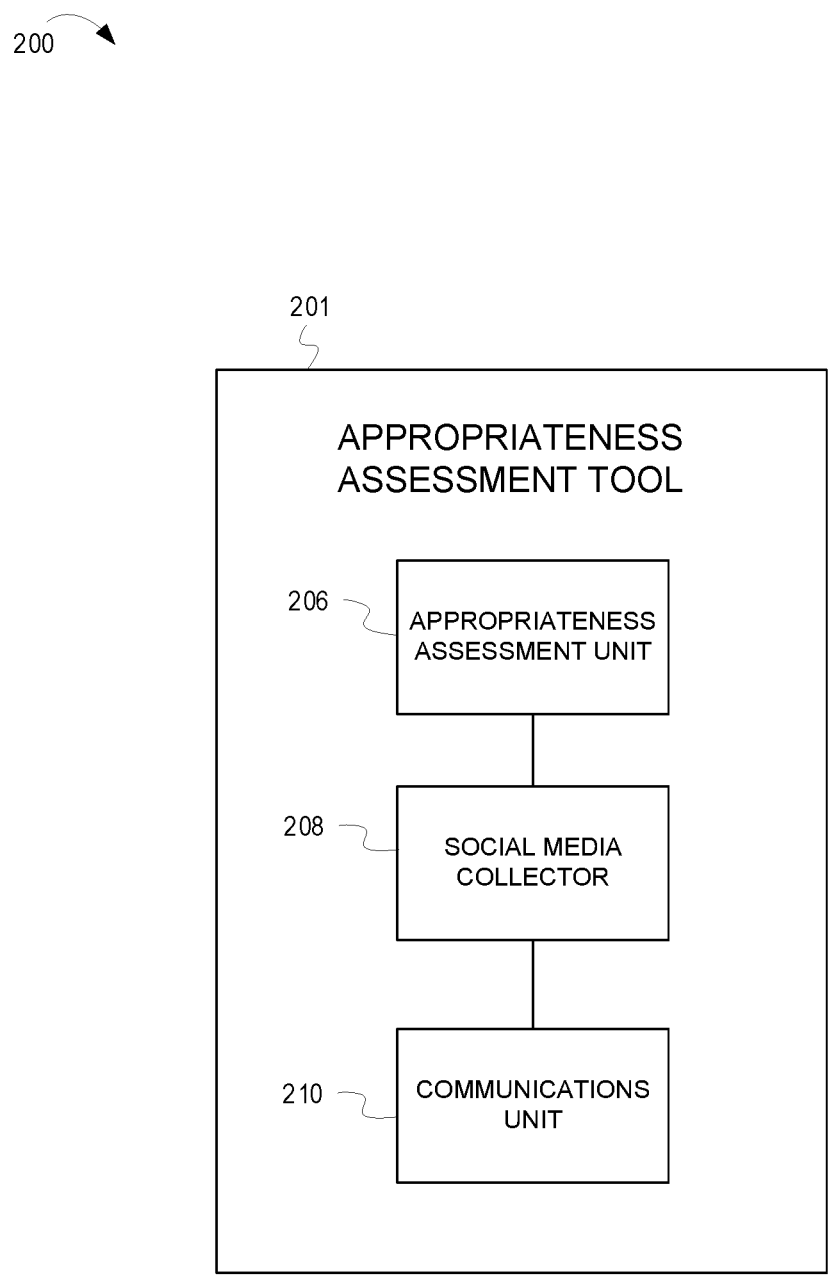
FIG. 2 is an illustration of an example appropriateness assessment tool architecture 200.

FIG. 2 is an illustration of an example appropriateness assessment tool architecture 200. In FIG. 2, the appropriateness assessment tool architecture 200 includes an appropriateness assessment tool ("tool") 201. The tool 201 includes an appropriateness assessment unit 206, a social media collector 208, and a communications unit 210. In some embodiments, the appropriateness assessment unit 206 trains the tool 201 to rank an appropriateness of information based on appropriateness training data. The appropriateness training data may include, but is not limited to, stored content, dictionaries, social media data, user preference settings, user reading history, appropriateness rules, and so forth. In some instances, the appropriateness training data is stored in a computer memory, is accessed via a network, is ascertained by analysis of content, is delivered by devices, etc. In some instances, the appropriateness assessment unit 206 includes a machine-learning classifier. The appropriateness assessment unit 206 can examine the training data to build an information sentiment ranking model that contains weighted sentiment features vectors. Each weighted sentiment features vector is a set in the information sentiment ranking model with corresponding weighted values. For example, a user interested in a specific topic might access content (e.g., online articles, images, etc.) related to that topic. The appropriateness assessment unit 206 can create weighted sentiment features vectors for each item from the accessed content and rate the accessed content as important to the user. In some instances, the appropriateness assessment unit 206 can create weighted sentiment features vectors for content that is contrary or antithetical to the topic.

Additionally, the appropriateness assessment unit 206 can construct expansion queries for appropriateness level ranking by examining feedback from a user's social media cluster. For instance, the appropriateness assessment unit 206 can utilize the social media collector 208 to collect information from social media sources associated with the user's social clusters. For instance, the social media collector 208 can track the user's social media activities on social media venues. For example, the social media collector 208 can collect and analyze social media posts, access to news websites, tweets, text messages, email, and so forth made by the user. The social media collector 208 can also identify key words, a time in which social interactions take place, media types associated with social interactions, origins of information, user profiles, etc., associated with social media sources of the user or other individuals in the social media. The social media collector 208 can construct a social media feedback relevance model.

The appropriateness assessment unit 206 can, at run time (e.g., when the user requests accesses to the content), utilize algorithms based on the information sentiment ranking model and the social feedback relevance model to determine appropriateness preferences related to the content. In some instances, the appropriateness assessment unit 206 can present a ranked list of content deemed inappropriate to the user.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). Moreover, some embodiments can perform more or less than all the operations shown in any flow diagram.

Figure 3:
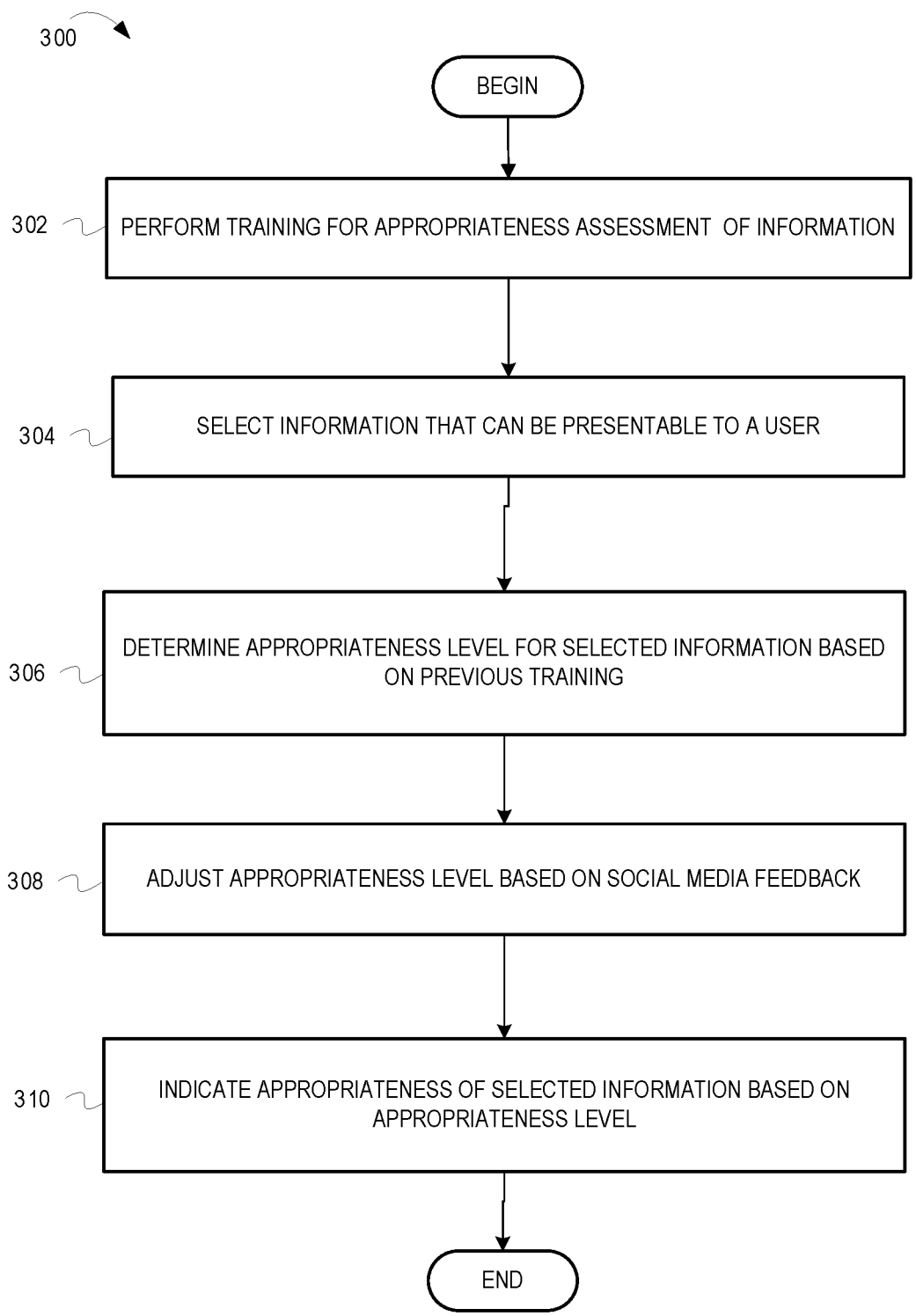
FIG. 3 is a flow diagram 300 illustrating an example of determining appropriateness of information.

FIG. 3 is an example flow diagram ("flow") 300 illustrating determining appropriateness of information. In FIG. 3, the flow 300 begins at processing block 302, where an appropriateness assessment tool ("tool") performs training for appropriateness assessment of information. For instance, the tool uses appropriateness data from an entity regarding certain words, phrases, images, concepts, etc. that are not appropriate. For instance, the tool can obtain training data from rules, previously accessed content, group member reading activity and comments, etc. For instance, a group of school employees may belong to a certain group (e.g., an online social network group) where the employees may read and post comments about scholarly articles, school policy, teaching methods, and so forth. Each of the group members may provide comments about which articles or links are inappropriate, or which may have some inappropriate content. In some instances, the group members may provide words or phrases that they consider inappropriate. The tool uses a classifier to run algorithms that parse the training data and develop inappropriateness indicators or inappropriateness rules.

In some examples, the tool can utilize machine learning to analyze user data and predict customized appropriateness preferences for the user (e.g., predict preferences for a user's perceived tolerance for satire, humor, innuendo, violence, profanity, and any other type of potentially offensive information). The user data may include the user's previous activity or treatment of information having a certain classification as that of the selected information. In some instances, the tool can determine a user's appropriateness preferences based on the user's reading history of previously read documents and articles including links to other documents. In some instances, the tool can utilize a classifier (e.g., a mathematical function that implements a classification algorithm to map the user data to a class or category).

The flow 300 continues at processing block 304, where the tool selects information that can be presentable to a user. For example, a group member from the online social network group mentioned previously can access a website using a device. The group member may request, from the website, access to a particular item (e.g., a web article, a web post, a file, an image, etc.). Before presenting the item to the group member, the tool selects the item and accesses an electronic version of the information ("selected information") contained within the item (e.g., text, images, sounds, links, metadata, etc.).

The flow 300 continues at processing block 306, where the tool determines an appropriateness level for the selected information based on the previous training. For example, the tool can parse the text from the selected information. The tool can compare the text to inappropriateness indicators or rules developed during the appropriateness training. In another example, the tool can evaluate contents of the selected information against the user's appropriateness preferences.

Based on the evaluation of the selected information, the tool can determine a range of appropriateness. The tool can generate a rating, or ratings, for the information and store the rating(s) in a memory store before providing or presenting the information or links to the information. In some examples, the range of values may be numerical values (e.g., according to a number scale from −10 to 10, wherein a value of −10 indicates a least degree of appropriateness and a value of 10 indicates a highest degree of appropriateness). In some examples, the range of values may be symbols or icons (e.g., a frowny faced icon to indicate inappropriateness, a neutral faced icon to indicate possible inappropriateness, a smiling icon to indicate appropriateness). In some examples, the range of values may be color values (e.g., green indicates appropriate, yellow indicates possible inappropriateness, and red indicates inappropriate). In some examples, the range of values may be textual descriptors (e.g., "not inappropriate," "possibly inappropriate," "inappropriate," "highly inappropriate," etc.). In other examples, the range of values can include any combination of different types of values and others not explicitly enumerated herein.

The appropriateness level may be based on various factors. For instance, in one example, the tool may determine that a web article includes some vulgar language or profanities. The tool may also determine that the web article includes words that express violence. The tool may also determine that the web article has hateful expressions. Based on the web articles having multiple types of inappropriate information (e.g., profane language, violence, and hate speech), the tool may rate the web article with a high inappropriateness level. In another example, the tool may determine that a web article only includes minor references to violence or only has a few crude, but not vulgar, phrases. As a result, the tool may rate the web article with a medium appropriateness level. In another example, the tool may determine that a web article includes no inappropriate information. As a result, the tool may rate the web article with a high appropriateness level.

In some instances, the tool analyzes images in the selected information (e.g., determines that captions for the images reference an offensive subject, determines that links to the images are from an offensive website, determines that a type of image includes possibly offensive imagery, etc.). The tool may determine an appropriateness level for the image based on the analysis.

In some instances, the tool determines different levels of appropriateness for different types of content included in the selected information. For instance, the tool may determine that the text of a web article is appropriate, but images, links, advertisements, etc. may be inappropriate.

The flow 300 continues at processing block 308, where the tool adjusts the appropriateness level based on social media feedback. In some instances, the tool determines social media feedback from the user and modifies the appropriateness level based on the user's social media feedback. For example, the tool determines sentiments of the user related to either the selected information or similar information expressed via a social media venue. The tool can use the sentiments to determine the appropriateness level. For instance, the tool can modify the appropriateness level for the selected information based on previous social media activity from the user who is requesting the selected information. For instance, the tool can determine social media venues to which the user is subscribed. The tool can determine the user's social media behaviors with the social media venues (e.g., the user's activity within a social media cluster, the user's comments expressed in tweets, the user's social media postings, the user's text messages, the user's email, etc.). Further, the tool can identify key words, time, media type, origin of information, and user profiles associated with an individual's social media behaviors. In some examples, the tool constructs a social media feedback relevance model based, at least in part, on the user's social media feedback.

Figure 4:
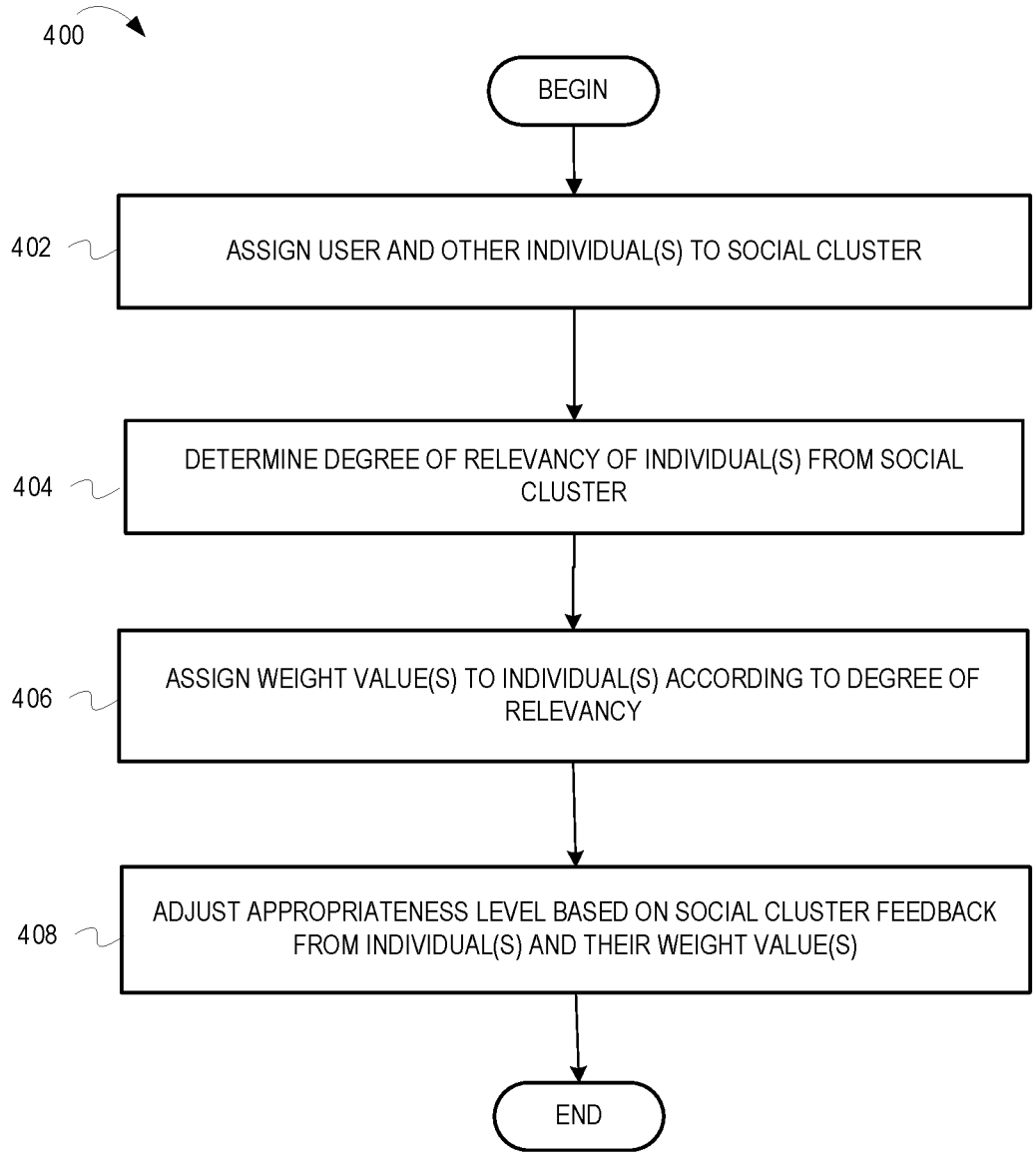
FIG. 4 is a flow diagram 400 illustrating an example of adjusting an information appropriateness level based on social network feedback.

In some instances, the tool can modify the appropriateness level for the selected information based on analysis of feedback from individuals from a social group or network associated with the user. An example is illustrated in FIG. 4 in more detail below. The tool can construct the social media feedback relevance model based, at least in part, on the social media feedback of the individuals from the social group.

The flow 300 continues at processing block 310, where the tool indicates an appropriateness of the selected information based on the appropriateness level. For instance, the tool can block the selected information if the appropriateness level indicates a high degree of inappropriateness. In another example, the tool can provide a graphical indicator that specifies the appropriateness level. The graphical indicator can be presented on a graphical user interface in a way that relates to the selected information and, in some instances, as it relates to the appropriateness level. For example, the graphical indicator can be an image positioned next to a link to the selected information. In another example, the graphical indicator can be a color of a link to the selected information. The color can indicate the level of appropriateness (e.g., a red link is inappropriate, a yellow link is possibly inappropriate, a green link is appropriate). In another example, the graphical indicator may be positioned on a graphical user interface according to the appropriateness level (e.g., positioned in a specific section for possibly inappropriate content, positioned at a bottom of a ranked list in a browser, positioned into a floating layer or toolbar of the graphical user interface, etc.). In some examples, the graphical indicator may be a selectable image that, when selected by user input, provides access to the selected information. Thus, the user is warned, by the graphical indicator, regarding the level of appropriateness before the selected information is accessed by the user. In some instances, the tool can block or provide graphical indicators for portions of the selected information. For example, the tool may block some images, or remove certain text, while concurrently providing access to some of the selected information.

In some examples, the tool indicates the appropriateness of the selected information based on a level of confidence that the tool has in the appropriateness level. The tool may utilize confidence levels depending on an amount of training and/or feedback it has received over time. For instance, the tool may have received training that indicates that selected information that mentions some amount of violence is possibly inappropriate. However, the tool has no feedback from the user or from individuals from social groups regarding the degree to which violence should be considered inappropriate. As a result, the tool can assign a low confidence level to the assessment of the appropriateness level. As time passes, the tool may receive feedback from members of the user's social groups indicating that violence is fairly inappropriate. For instance, the tool determines that the user belongs to a passivism group in a social network. In another example, the tool determines that multiple social contacts of the user express negative comments toward violence. The tool, therefore, can increase the confidence level of the assessment of the appropriateness level based on the feedback from the social group members. In another instance, the tool may receive social media feedback from the user that consistently expresses negative comments towards violence. Thus, the tool can increase the confidence level further.

Depending on the confidence level, the tool may determine different ways to indicate appropriateness of the selected information. For example, if the tool determines a high inappropriateness of the selected information with a high degree of confidence, the tool can block the selected information from being presented. However, if the tool has a lower degree of confidence in the appropriateness assessment, the tool may instead provide a warning (e.g., a graphical warning, an audible warning, a vibratory warning, etc.).

FIG. 4 is an example flow diagram ("flow") 400 illustrating adjusting an information appropriateness level based on social network feedback. In FIG. 4, the flow 400 begins at processing block 402, where an appropriateness assessment tool assigns a user and other individual(s) to a social cluster. For example, the tool may determine that the user is a member of a certain online group. The tool may assign the user and one or more other individuals who are members of the online group to a social cluster having a certain classification or category associated with the online group. For example, the tool may determine that the user belongs to a certain work group. The tool may access the user's social network websites using application program interfaces (APIs) associated with each of the websites. The tool searches the user's social network websites to determine whether individual(s) who are social contacts of the user are also affiliated with the work group. For example, the tool can detect that the user is a subscriber of a certain website for the work group established on one of the social network websites. The tool can determine, via an API for the website, names and/or profiles of one or more other subscribers of the website. In some instances, the tool may detect names of individual(s) who post or comment on the website. The tool can then assign the subscribers, posters, and/or commenters of the website, along with the user, a given classification that identifies them as members of a social cluster for the work group. For example, the tool stores information in a database that links the user and the members of the work group into a database table for the social cluster.

In some examples, the tool can group the user and the other individual(s) into social clusters based on relationships between the user and the other individual(s). For example, the tool can detect who are social contacts of the user in social networks. The tool can then group the user and the social contacts into social network groups (e.g., Facebook™ contacts, Twitter™ followers, friends, family, work colleagues, etc.).

In some examples, the tool can group the user and the individual(s) based on similar online activity for a particular category of information. For example, the tool may determine that the user and the other individual(s) access the same websites, perform similar search queries, post comments on similar websites, make similar online purchases, etc.).

In other example, the tool can group the user and other individual(s) based on similar demographics. For example, the tool can access online profiles for the user and the other individual(s) and determine whether they have similar characteristics, similar ages, similar careers, similar education, etc.

The flow 400 continues at processing block 404, where the tool determines a degree of relevancy of the individual(s) from the social cluster. For example, the tool can determine the relevancy of the individual(s) based on relationship strength of the individual(s) within a hierarchy associated with the social cluster. The tool can determine the strength of the relationship of the individual to the social cluster based on various factors. Some of the factors may include, but are not limited to, hierarchical titles, subject matter expertise, professional experience, educational background, academic credentials, practical knowledge, social roles, social status, an amount of time an activity is performed, a frequency at which an individual browses or posts information, a number of comments, ratings assigned to comments, etc. Another example factor includes a degree to which the user knows the individual from the cluster. For example, the tool can determine a length of time that the user and the individual have been social contacts. The tool can determine, from social contact profiles and/or applications associated with social media venues, whether the user and the individual are friends, family, work colleagues, and so forth. In another example, the tool can deduce a degree of familiarity between the user and the individual based on titles or roles assigned to the user and the individual within the social cluster. For example, the tool can determine that an individual with a title of "President" is likely known to the user and to all others of the members of the group. Likewise, the tool can determine that individuals who work in the same divisions or departments of an organization are more familiar with each other than with individuals from other divisions or departments.

One example of determining a degree of relevancy of an individual to the group is to detect a title or rank of an individual within a hierarchical structure of the group. For instance, as explained previously in FIG. 1, the tool determined a title of an individual (e.g., the title of "Principal"). In other examples, titles such as chief executive officer, president, pastor, parent, etc. indicate a high level of authority within a hierarchical structure. Therefore, the individuals with higher levels of authority may have higher relevancy or relationship strengths within the group. The tool can identify the individual and their relationship strength by analyzing words used in the social comments that identify the relationship. For instance, when a pastor posts comments, the pastor's name may include the word "pastor." In a business setting, an individual's business title may be specified in their comments, in their signature blocks, in their profiles, etc.

The flow 400 continues at processing block 406, where the tool assigns weight value(s) to the individual(s) according to the degree of relevancy. In some instances, the tool may only select certain individuals from the group that have a relevancy level that exceeds a threshold. The tool can generate weighted sentiment features vectors. Each weighted sentiment features vector is a set in an information sentiment ranking model with corresponding weighted values. For example, a person interested in a specific topic might access information (e.g., articles, documents, photos, etc.) related to that topic. The tool creates a corresponding weighted sentiment features vector for the accessed information. For instance, the tool generates a rating for the topic that signifies a given importance value of the topic to the user. In some instances, the tool can create a corresponding weighted sentiment features vector for information that is antithetical to this topic based on direct evidence, such as comments made by the individual(s) against the topic, or based on indirect evidence, such as a lack of access by the user to information that is antithetical to the topic.

In some instances, the process of determining the degrees of relevancy and assigning the weight values occurs continuously. The tool can store relevancy information and weight values of the individual(s) from each cluster. As the tool obtains more feedback data from the individual(s), the tool can learn new information about the individual that would cause the degree of relevancy to increase. For example, at a first given time the tool reads a profile of an individual from the cluster and, based on information in the profile, the tool assigns a weight value to the individual. However, at the first given time, the individual may not have previously specified their academic credentials in their profile. Therefore, the tool assigns a low degree of relevancy for that individual within the cluster. At a subsequent, second given time, the tool determines that the individual has updated their profile to show their academic credentials. Thus, the tool reassesses the weight value for the individual (e.g., the tool increases the weight value) based on the updated academic credentials. In another example, the tool may reassess an individual's relevancy based on an amount of time the individual has been in the group (which increases over time) or by a quantity or quality of comments provided since the last time the individual's relevancy was assessed.

The flow 400 continues at processing block 408, where the tool adjusts the appropriateness level based on the social cluster feedback from the individual(s) and based on their weight value(s). Social cluster feedback, related to the selected information, may include, but is not limited to, data related to activity performed by the individual(s), profile settings of the individual(s), comments made by the individual(s), browsing history of the individual(s), etc. For example, the tool can detect activity of the individual(s) by analyzing a browsing history of the individual(s). In some instances, the tool can detect the activity of the individual(s) by connecting to social media sources via a network using Application Programming Interfaces (APIs) and collecting activity data from the social media sources related to the information. The tool can determine whether the activity is relevant to the selected information by determining whether the individual(s) from the group have accessed the actual information (e.g., have accessed the same article). In some instances, the individual's activity is not of the selected information itself, but is of other related information. For instance, the tool can determine whether the activity is for other information that has a similar classification, or set of classifications, that were assigned to the selected information. The tool can further detect the individual(s)' treatment of the selected information or the similar information. For example, the tool can detect comments made by the individual(s) about the selected information. In some examples, the tool can determine an amount of time that the individual(s) spent viewing the selected information. In another example, the tool can determine a rating assigned by the individual(s) to the selected information. In some examples the tool can determine the social media behaviors of the individual(s) (e.g., the individual(s)' activity within a social media cluster, the individual(s)' comments expressed in tweets, the individual(s)' social media postings, the individual(s)' text messages, the individual(s)' email, etc.). Further, the tool can identify key words, time, media type, origin of information, and user profiles associated with the individual(s)' social media behaviors.

The tool can further modify the appropriateness level for the selected information based on the activity of the individual(s) and the weight values. For instance, the tool may receive social cluster comments by two relevant individuals from the social cluster. A first individual has a higher relevance to the social cluster based on one of the several factors mentioned previously. For example, the first individual is a leader or expert within the hierarchical structure of the social cluster. The tool can assign the first individual a relevancy weight value of 10 on a scale of 0 to 10, with 10 being the highest relevancy value. The tool assigns a second relevancy weight value of 5 out of 10 to the second individual from the social cluster. The first individual makes first comments about certain web content that the tool interprets as praise by the first individual of the content. The tool assigns a content rating value of 10 on a scale of −10 to 10 based on the comments of the first individual. The second individual makes second comments about the content that the tool interprets as highly negative by the second individual. The tool assigns a content rating value of −10 by the second individual. The tool may average the two reactions together with a higher weight given to the first individual. For example, the tool may utilize an algorithm as follows:

$$\text{Appropriateness Level} = \frac{1}{\text{Number}(n) \text{ of relevant individuals from social cluster}} \times \sum_{i=1}^{n} \begin{bmatrix} \text{Weight of relevant individual } (i) \times \text{Content rating attributed to relevant individual from social cluster} \end{bmatrix}$$

Equation 1

Using the values from the example mentioned in the previous paragraph, Equation 1 would compute as ½×((10)×(10)+(−10)×(5))=25 out of a scale of −100 to 100, where values from −100 to −1 represent degrees of negative appropriateness (or inappropriateness) and values from 1 to 100 represent degrees of positive appropriateness. Thus, because the weight of the first individual was twice as high as that of the second individual, the appropriateness level computed to a positive value of 25. Thus, according to the computed appropriateness value, based on feedback and relevancy weights of the individuals in the user's social cluster, the tool can predict that the user would likely have a positive sentiment of the content, and, as such, the tool determines to present the content to the individual. The tool may also present a graphical indicator corresponding to the appropriateness level for the content. For example, the tool could indicate the score of 25, or an equivalent indicator (e.g., values from −100 to −25 receive a red indicator, values from −24 to 24 receive a yellow indicator, and values from 25 to 100 receive a green indicator). In other instances, the tool may only indicate whether the content has a negative appropriateness level.

It should be noted that Equation 1 is only one example of how an appropriateness level may be computed. There are countless other ways to compute relevancy weight values and social media feedback. For example, instead of assigning content ratings based on the feedback, the tool may instead assign higher relevancy values to certain words or phrases used in comments by a highly weighted individual while retraining the tool.

Figure 5:
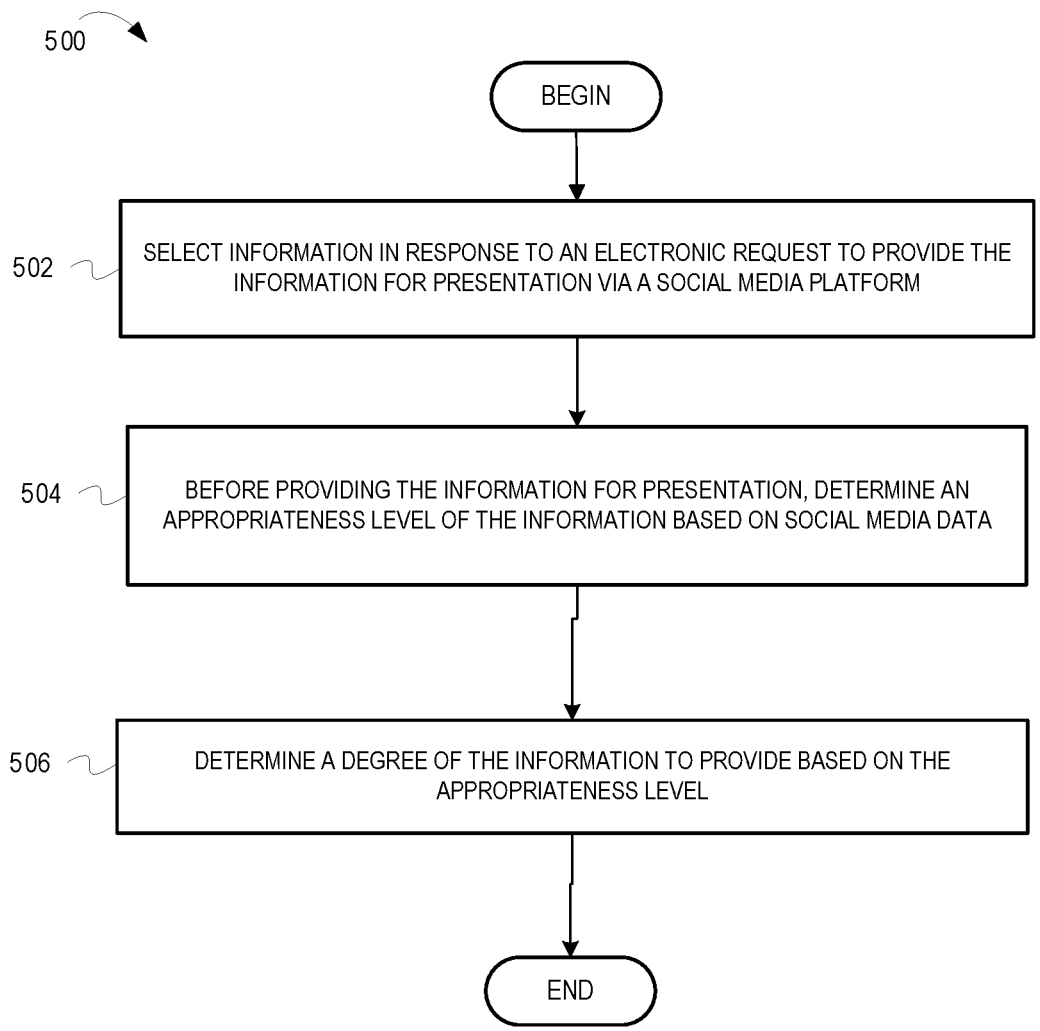
FIG. 5 is a flow diagram 500 illustrating determining appropriateness of information based on social media data.

FIG. 5 is an example flow diagram ("flow") 500 illustrating determining appropriateness of information based on social media data. In FIG. 5, the flow 500 begins at processing block 502 wherein an appropriateness assessment tool ("tool") selects information in response to an electronic request to provide the information for presentation via a social media platform. For example, a social media platform may attempt to push content to a user without the user actively seeking the content. For instance, some social media platforms, such as Facebook™, provide a news feed feature for presentation after a user account has logged into the social media platform. The news feed feature pushes content from social contacts associated with the user account and/or from sponsors of the social media platform.

The flow 500 continues at processing block 504 where, before providing the information for presentation, the tool determines an appropriateness level for the information based on social media data. For example, the tool may analyze content before it is presented via the newsfeed feature for the social media platform. Through the analysis, the tool can identify portions of the content that meet inappropriateness thresholds. The tool can utilize social media data to determine the appropriateness level. For example, the tool can analyze posting data, comments, ratings, tags, etc. generated via the social media platform regarding the content, or of content having a similar nature. For instance, a first user account may be a social contact of a second user account. The first user account may have seen posted content in her newsfeed that she finds objectionable. So, the first user account indicates sentiments about the content using a feature of the social network platform associated with the content, such as by making a negative comment about the content in a comments section or by assigning a negative rating (e.g., a "dislike" or "thumbs down" rating) to the content posting. When the first user account uses the feature associated with the content, the social media platform automatically provides the posted content for presentation in the news feed for the second user account. However, before the content is presented in the news feed for the second user account the tool can analyze the negative sentiments provided by the first user account and determine a degree of appropriateness for the content specific to the second user account. For example, if the first user account indicated a "dislike" rating, then the tool may assign a medium level appropriateness rating to the content. If, however, the first user account makes a strongly negative comment about the content, the tool may assign a low level appropriateness rating (i.e., a high inappropriateness rating) to the content. In some instances the tool may also detect activities by the first user account that are indirectly related to the content, which may indicate a potential opinion regarding the content. For example, the tool may detect that the first user account unfollows or unfriends someone after the first user account reviews the content. Based on the activity, the tool may infer that the first user account found the content to be objectionable. Furthermore, in some instances the tool can detect previous sentiments expressed by the first user account or by the second user account of other content that is similar to the posted content. The tool can compute the appropriateness level based on the previously indicated sentiments.

In some instances, the tool can take into account a relationship strength between the first user account and the second user account to compute the appropriateness level. For example, if the first user account has an authoritative role in a social cluster to which both the first user account and the second user account belong, then the tool can weight the first user account more than other user accounts from the social cluster who also indicate sentiments about the content. The tool can also consider credentials of the first user account relevant to a social cluster to which both the first user account and the second user account both belong. For example, the tool may determine that the first user account and the second user account both belong to a common social network group (e.g., the tool determines that they are both subscribed to the same social group or webpage within the social media platform). The tool can access a profile for the first user account and determine educational or work credentials that relate to a subject matter associated with the group. The educational or work credentials may indicate expertise by the first user account in the group. Therefore, the tool may factor in the sentiments of the first user account more highly than for other accounts who express sentiments on the content. The tool may also consider a number of positive or negative ratings from the social network contacts. For example, if a majority of social contacts give a positive rating (e.g., a "Like") to a content posting, then the tool can factor in the group preference when determining the appropriateness level.

The flow 500 continues at processing block 506 where the tool determines a degree of the information to provide based on the appropriateness level. For example, if the tool determines a high appropriateness level (i.e., the content is highly appropriate), then the tool may not interfere with the social network platform's presentation of the content via the news feed feature. If the tool determines a medium appropriateness level, the tool may give a warning indicator about the content. If the tool determines a low appropriateness rating, then the tool may filter the content before it is presented in the news feed.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
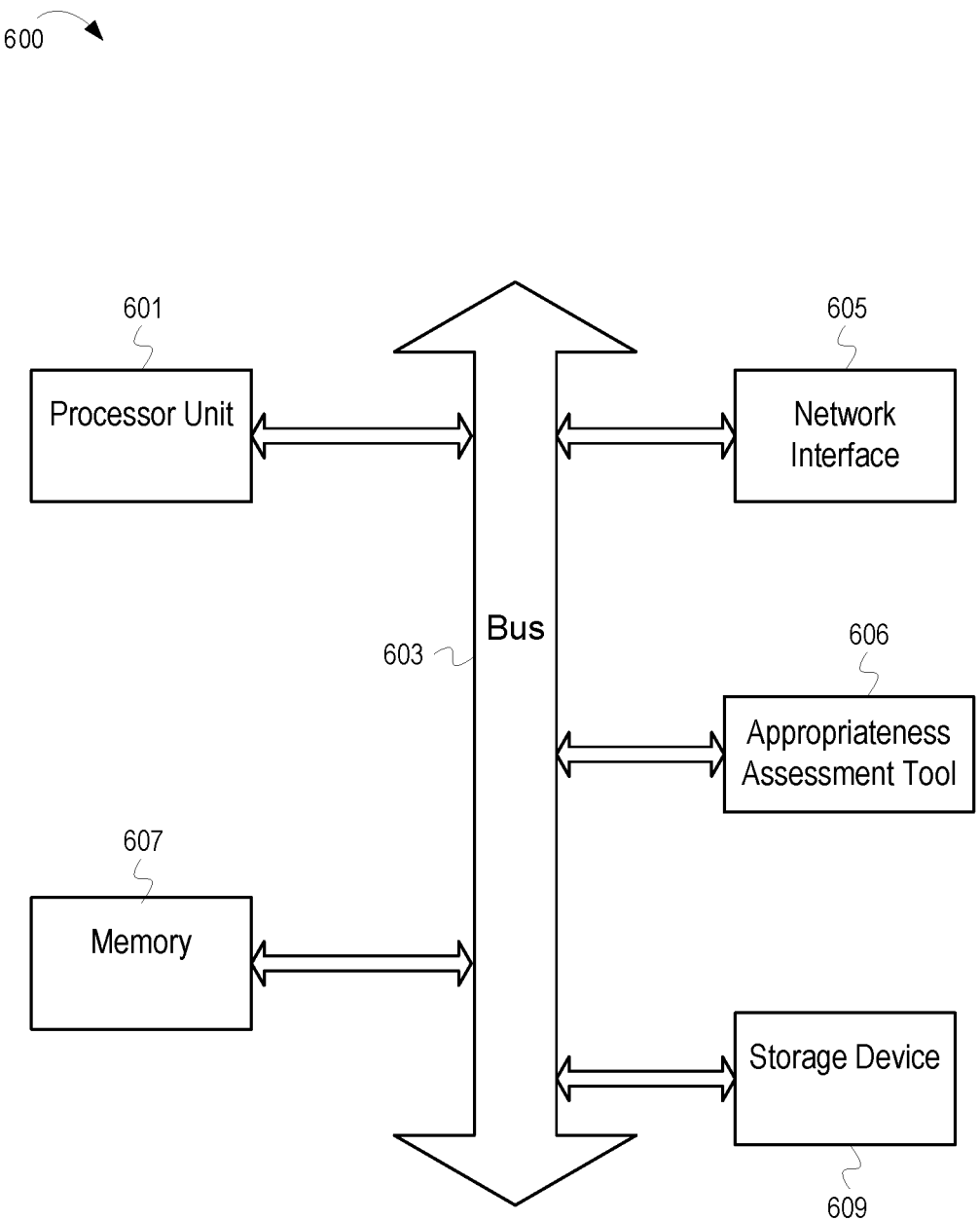
FIG. 6 is an illustration of an example computer system 600.

FIG. 6 is an example illustration of a computer system 600. The computer system 600 includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The memory 607 embodies functionality to implement embodiments described above. The memory 607 may include one or more functionalities that facilitate determining appropriateness of information as described above. For example, the memory 607 may include, or have access to, an appropriateness assessment tool 606. The appropriateness assessment tool 606 assesses appropriateness of information as described herein. Any one of the functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601. Some, or all, portions of the computer system 600 may comprise an appropriateness assessment tool.

Figure 7:
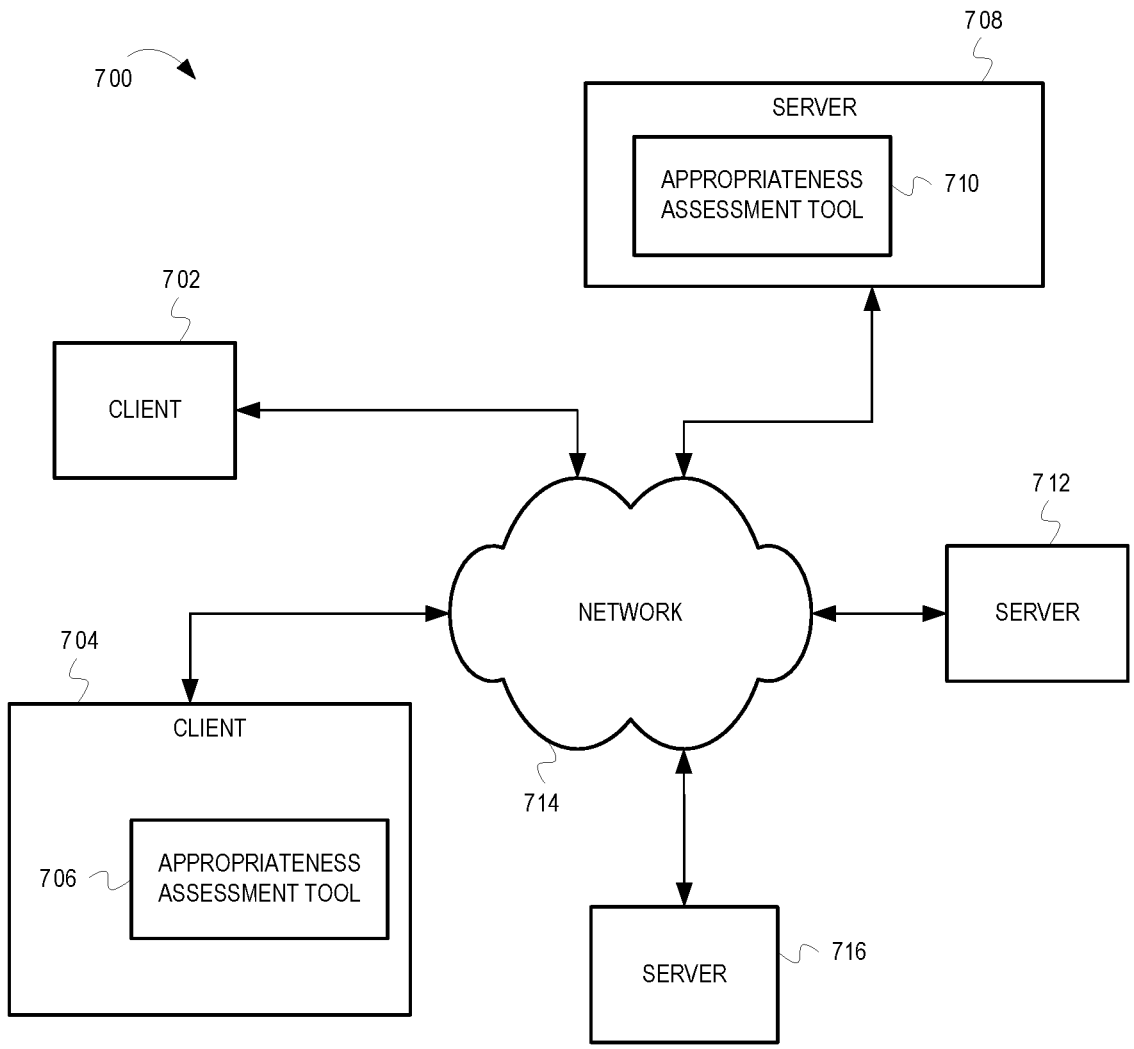
FIG. 7 is an illustration of an example network environment 700.

FIG. 7 is a block diagram of an example network environment 700, according to some embodiments of the invention. The network environment 700 can include multiple client devices ("clients") 702 and 704 connected to multiple servers 708, 712 and 716 via a network 714. The network 714 can be a local area network (LAN), a wide area network (WAN), a telephone network, such as the Public Switched Telephone Network (PSTN), an intranet, the Internet, or a combination of networks. For simplicity, the network environment 700 shows only two clients 702 and 704 and three servers 708, 712, and 716 connected to the network 714. An appropriateness assessment tool (e.g., appropriateness assessment tool 706 and/or appropriateness assessment tool 710) may be embodied in one or more client machines, possibly including one or more of the clients 702 and 704 or in a server, such as the server 708. According to some embodiments the appropriateness assessment tool (one or more of appropriateness assessment tool 706 and/or appropriateness assessment tool 710) assesses appropriateness of information as described herein. In practice, there may be a different number of clients and servers. In addition, in some instances, a client may perform the functions of a server and a server may perform the functions of a client. Any one of the clients 702, 704 and servers 708, 712, and 716 can be embodied as the computer system 600 described in FIG. 6. The clients 702 and 704 can be mainframes, minicomputers, personal computers, laptops, personal digital assistants, or the like. Additionally, the clients 702 and 704 may be capable of connecting to the network 714. The clients 702 and 704 may transmit data over the network 714 or receive data from the network 714 via a wired, wireless, optical, or other connection.

While the embodiments are described with reference to various implementations and exploitations, it will be understood that these embodiments are illustrative and that the scope of the inventive subject matter is not limited to them. In general, techniques for assessing appropriateness of information as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of determining appropriateness of information by an electronic appropriateness assessment tool comprising:
    selecting, by the electronic appropriateness assessment tool, an information included in a webpage in response to an electronic request to provide the information for presentation via a device associated with a user;
    generating a predicted level of emotional reaction and a predicted assessment of appropriateness that the information may evoke in the user if the information were viewed by the user;
    before providing the information for presentation via the device, generating an assessment of appropriateness of the information for the user based on social media data associated with the user, the predicted level of emotional reaction, and the predicted assessment of appropriateness;
    determining, via the electronic appropriateness assessment tool, an appropriateness level of the information based on a set of user preferences and the assessment of appropriateness of the information;
    generating, based on the appropriateness level, a graphical indicator that visually depicts a degree of inappropriateness of the information based on the set of user preferences; and
    providing the graphical indicator for presentation via the device before presentation of the information.

2. The method of claim 1 further comprising:
    determining, as the social media data, social media remarks from one or more individuals associated with a social cluster to which the user belongs.

3. The method of claim 2 further comprising:
    grouping the user and the one or more individuals into the social cluster based on social networking associations between the user and the one or more individuals.

4. The method of claim 2 further comprising:
    determining a degree of relevancy of the one or more individuals in the social cluster; assigning a weight value to the one or more individuals based on the degree of relevancy;
    determining account data associated with the one or more individuals related to the information; and
        computing the appropriateness level based on the weight value and the account data.

5. The method of claim 4, wherein the determining the degree of relevancy of the one or more individuals in the social cluster comprises determining a strength of a relationship of the one or more individuals to the user based on one or more of a hierarchical title of the one or more individuals, a subject matter expertise of the one or more individuals, professional experience of the one or more individuals, an educational background of the one or more individuals, academic credentials of the one or more individuals, practical knowledge of the one or more individuals, one or more social roles of the one or more individuals, a social status of the one or more individuals, an amount of time an activity is performed by the one or more individuals, a frequency at which the one or more individuals makes posts in a social venue for the social cluster, ratings assigned to group comments made by the one or more individuals, and a degree to which the user knows the one or more individuals.

6. The method of claim 4, wherein the determining the account data comprises:
analyzing activity related to the information performed by the one or more individuals via one or more user accounts of one or more social media venues; and
determining, based on the analyzing of the activity, one or more sentiments of the one or more individuals associated with the information.

7. The method of claim 6, wherein the analyzing the activity comprises one or more of analyzing browsing history of the one or more individuals of the information, analyzing access by the one or more individuals to additional information that has a similar classification to the information, analyzing comments made by the one or more individuals about the information, analyzing an amount of time that the one or more individuals spent viewing the information, analyzing a rating assigned by the one or more individuals to the information, analyzing one or more postings in a social venue related to the information, and analyzing an electronic message of the one or more individuals related to the information.

8. The method of claim 4, wherein the determining the account data comprises:
accessing one or more user profiles for one or more user accounts of the one or more individuals; and
determining, from the one or more user profiles, settings that specify preferences related to the information.

9. The method of claim 1, further comprising one or more of blocking presentation of the information by the device in response to determining that the appropriateness level exceeds a threshold established in a setting for a user account for the user or providing, for presentation via an output element of the device, an indicator quantifying the appropriateness level.

10. The method of claim 1, further comprising training the appropriateness assessment tool to assess appropriateness of the information before the electronic request occurs, wherein the assessing the appropriateness of the information is based on the training.

11. A computer program product for electronically determining appropriateness of information via an electronic appropriateness assessment tool, the computer program product comprising a non-transitory computer readable storage medium having computer usable program code embodied therewith, the computer usable program code configured to:
select, via the electronic appropriateness assessment tool, an information included in a webpage in response to an electronic request to provide the information for presentation via a device associated with a user;
generate a predicted level of emotional reaction and a predicted assessment of appropriateness that the information may evoke in the user if the information were viewed by the user;
before providing the information via the device, generating an assessment of appropriateness of the information for the user based on social media data associated with the user, the predicted level of emotional reaction, and the predicted assessment of appropriateness;
determine an appropriateness level of the information based on a set of user preferences and the assessment of appropriateness of the information;
generate, based on the appropriateness level, a graphical indicator that visually depicts a degree of inappropriateness of the information based on the set of user preferences; and
provide the graphical indicator for presentation via the device before presentation of the information.

12. The computer program product of claim 11, wherein the computer usable program code is further configured to:
determine the social media feedback from one or more individuals associated with a social cluster to which the user belongs.

13. The computer program product of claim 12, wherein the computer usable program code is further configured to:
group the user and the one or more individuals into the social cluster based on social networking associations between the user and the one or more individuals.

14. The computer program product of claim 13, wherein the computer usable program code is further configured to:
analyze activity related to the information performed by the one or more individuals via one or more social media venues; and
determine, based on analyzing of the activity, one or more sentiments of the one or more individuals associated with the information.

15. The computer program product of claim 12, wherein the computer usable program code is further configured to:
determine a degree of relevancy of the one or more individuals in the social cluster; assign a weight value to the one or more individuals based on the degree of relevancy; determine data associated with the one or more individuals related to the information; and compute the appropriateness level based on the weight value and the data.

16. An apparatus comprising:
an electronic processing unit; and
a memory storage unit configured to store instructions, which when executed by the electronic processing unit cause the apparatus to perform operations to:
select information in response to an electronic request to provide an information included in a webpage for presentation via a device associated with a user,
generate a predicted level of emotional reaction and a predicted assessment of appropriateness that the information may evoke in the user if the information were viewed by the user,
before providing the information via the device, generating an assessment of appropriateness of the information for the user based on social media data associated with the user, the predicted level of emotional reaction, and the predicted assessment of appropriateness,
determine, in response to assessing the appropriateness of the information, an appropriateness level of the information based on a set of user preferences and the assessment of appropriateness of the information,
generate, based on the appropriateness level, a graphical indicator that visually depicts a degree of inappropriateness of the information based on the set of user preferences; and
provide the graphical indicator for presentation via the device before presentation of the information.

17. The apparatus of claim 16, wherein the memory storage unit is configured to store instructions, which when executed by the electronic processing unit cause the apparatus to perform operations to:
determine the social media feedback from one or more individuals associated with a social cluster to which the user belongs.

18. The apparatus of claim 17, wherein the memory storage unit is configured to store instructions, which when executed by the electronic processing unit cause the apparatus to perform operations to:
  group the user and the one or more individuals into the social cluster based on social networking associations between the user and the one or more individuals.

19. The apparatus of claim 17, wherein the memory storage unit is configured to store instructions, which when executed by the electronic processing unit cause the apparatus to perform operations to:
  determine a degree of relevancy of the one or more individuals in the social cluster; assign a weight value to the one or more individuals based on the degree of relevancy; determine data associated with the one or more individuals related to the information; and compute the appropriateness level based on the weight value and the data.

20. The apparatus of claim 16, wherein the memory storage unit is configured to store instructions, which when executed by the electronic processing unit cause the apparatus to perform operations to train the appropriateness assessment tool to assess appropriateness of the information before receiving the electronic request, wherein assessment of the appropriateness of the information is based on the training.

\* \* \* \* \*